United States Patent [19]

Petrosillo

[11] Patent Number: 4,975,291

[45] Date of Patent: Dec. 4, 1990

[54] SPICED MEAT PRODUCT

[76] Inventor: Thomas P. Petrosillo, R.D. 1, Willsie Rd., East Berne, N.Y. 12059

[21] Appl. No.: 274,973

[22] Filed: Nov. 22, 1988

[51] Int. Cl.$^5$ .............................................. A23L 1/317
[52] U.S. Cl. ...................................... 426/76; 426/129; 426/412; 426/414; 426/513; 426/646
[58] Field of Search ............... 426/108, 129, 135, 646, 426/412, 413, 513, 119, 414, 76

[56] References Cited

U.S. PATENT DOCUMENTS

| | | | |
|---|---|---|---|
| 2,475,408 | 7/1949 | Smelzer | 426/108 X |
| 3,190,759 | 6/1965 | Stryk et al. | 426/412 |
| 3,717,473 | 2/1973 | Bissett | 426/76 |
| 4,015,021 | 3/1977 | Harima et al. | 426/413 X |
| 4,285,980 | 8/1981 | Lewis | 426/413 X |
| 4,663,170 | 5/1987 | Matthews et al. | 426/129 X |

Primary Examiner—Arthur L. Corbin
Attorney, Agent, or Firm—Schmeiser, Morelle & Watts

[57] ABSTRACT

A meat product having the flavor, aroma and texture of a common frankfurter fabricated as a patty for easier cooking and use. A process for fabricating the meat product where molds are filled with the meat product for producing the desired shape while maintaining the skin tension appreciated in a common frankfurter. The molds are flexible and a multiplicity of the molds may be placed over a nozzle through which the meat product is extruded.

5 Claims, 5 Drawing Sheets

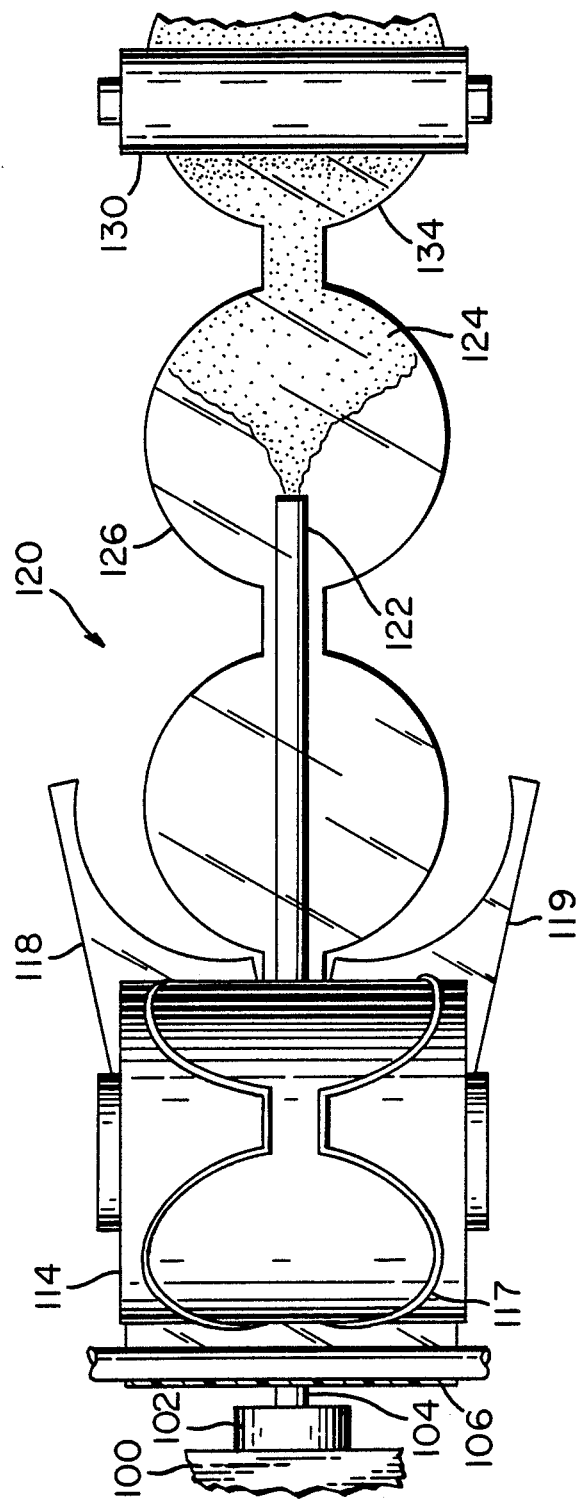

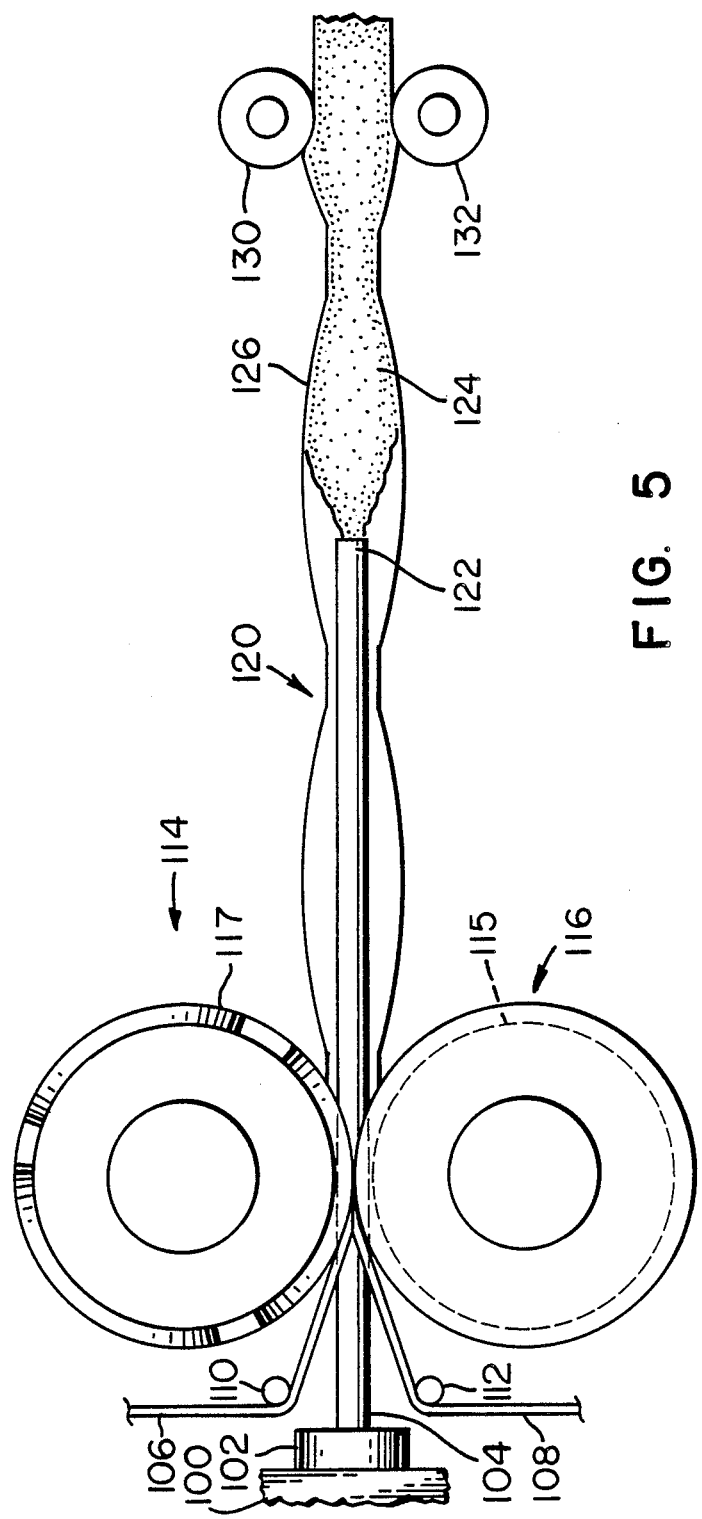

SPICED MEAT PRODUCT

BACKGROUND OF THE INVENTION

The present invention relates to distinctive food products. More particularly it relates to a meat product which has the flavor and aroma of the familiar frankfurter but which has distinctive features of form and fabrication which lend novel and desirable attributes to the product.

The frankfurter is a common article of commerce and is characterized by its content of pork or beef or some combination of the two and by some characteristic spices or seasonings to give the product its distinctive aroma and flavor. The frankfurter is also known as a hot dog because its long cylindrical shape gives it a resemblance to the dachshund. It is a most familiar article of commerce and millions are purchased and eaten each year. A number of patents relating to frankfurters have been issued and among them are the following which are known to the applicant: Nos. 4129899; 3857330; 4713135; 4741938; 4356201; 2698800 and 4563231.

In spite of the large scale consumption of hot dogs, or perhaps because of it, certain shortcommings and deficiencies have been recognized in the production, handling, distribution, preparation and consumption of hot dogs. One problem which has received widespread attention is the tendency of children to choke on the hot dogs which they eat. This problem arose in part because the hot dog fits easily in the child's mouth so that a piece having the full diameter of the dog can be bitten off. The problem is that the child tries to swallow the piece but the piece is too large to be swallowed whole by the child.

Another problem arises in cooking. One aspect of this problem is that almost all grills have parallel bars to support the food being grilled. The hot dog tends to fall into the opening between two bars and to make it difficult for the chef to turn the hot dog on the grill. A result can be that almost all the heat is delivered to one side of the hot dog and it is excessively cooked on one side and undercooked on the other.

In order to avoid having the hotdog nest itself between two bars of the grill some chefs lay the hotdog accross a number of bars. This makes it easier to roll the hotdogs over to cook them more evenly. However frequently the hotdogs continue to roll and fall right off the grill. This is particularly the case if the grill is an outdoor type that is frequently located on uneven terrain.

Another common problem of which users of hot dogs complain is the tendency of the product to become dried out by the cooking of its long cylindrical form. To avoid such drying our special cooking utensels which operate at lower temperatures are manufacured for the food processing trade. These low temperature cookers avoid the drying out of the hot dogs but do not impart the desirable zestful flavor to the cooked hot dogs. One such device is a special cooking rack having a set of low temperature rollers constantly turning beneath a number of revolving hot dogs. The hot dogs sometimes stay on such racks for hours without burning but the long term, low temperature cooking can impart an oiliness or greasiness to the hot dogs which detract from their otherwise desirable flavor and texture.

OBJECTS OF THE PRESENT INVENTION

It is accordingly one object of the present invention to provide an improved spiced meat product.

Another object is to provide a method of preparing the improved spiced meat product.

Still another object is to overcome some of the difficulties and disadvantages which are found in the use of the conventional elongated spiced meat product.

Another object is to provide a product which fewer children are likely to choke on.

Another object is to provide a simple and therefore economical method for producing the products of the present invention.

Another object is to provide a product which has less tendency to dry out during cooking.

Another object is to provide a product which has less tendency to become greasy or oily from cooking.

Other objects will be in part apparent and in part pointed out in the description which follows.

SUMMARY OF THE INVENTION

In one of its broader aspects objects of the invention may be achieved as follows. In practicing the present invention a unique product is formed. The product is a string of linked disks of a seasoned meat. The product is formed by first forming a plurality of linked round plastic pockets. Each of the individual pockets is linked by a short tubular connection. A filling pipe is inserted through a number of the tube linked pockets so as to extend through a string of several pockets and their connecting tubes. A slurry of spiced meat filling is then introduced in turn into the last pocket of the string to fill it out to contain a generally rounded short cylindrical body of the spiced meat. As the last pocket is filled it is slowly withdrawn from the end of the filling pipe.

If the pocket is free to fill to any shape the pocket is preferably underfilled and is then pressed to give it a short cylindrical shape after being withdrawn from the end of the filling pipe. Alternatively the pocket may be filled in a confined space between two flat surfaces so that it acquires the short cylindrical shape as it is filled and without any subsequent pressing or rolling to distribute its contents. Each of individual pockets and connecting tubes of the string is then filled in turn as the first pocket was filled. After filling and shaping the content of the pockets is congealed by heat to form an external skin on the product exterior. The result is a string of short cylinders or disks of spiced meat product connected by linking tubular connectors. The plastic skin from which the string of connected pockets was formed before filling may then be removed as by peeling from the congealed product.

BRIEF DESCRIPTION OF THE DRAWINGS

In the description which follows greater clarity of understanding will be gained if reference is made to the accompanying drawings in which:

FIG. 4 is a top plan semischematic illustration of a mechanism for continuously forming and filling a string of plastic pockets.

FIG. 5 is a side elevation of the mechanism of FIG. 4.

DETAILED DESCRIPTION OF THE INVENTION

What is accomplished by the present invention is the provision of a novel and unique food product and the provision of a novel and economical method of forming the product. The product itself and how it is formed is described here now with reference to the accompanying figures.

Figure 1:
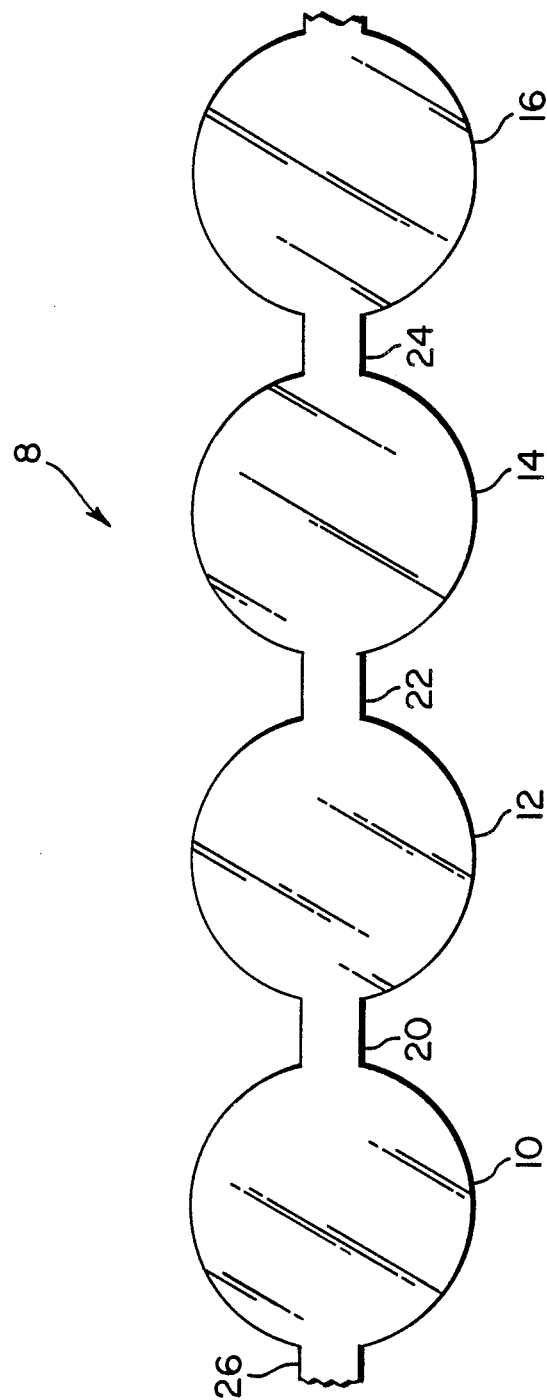
FIG. 1 is an illustration of a string of linked pockets formed of plastic strip.

With reference first to FIG. 1 a set of attached plastic pockets 10, 14, 16 and 18 are illustrated. Such a set of pockets may be formed conveniently from plastic strip material. For this purpose two strips of a plastic such as casing cellulose may be employed. The two strips are placed one over the other and a sealing and cutting operation is performed on the pair of strips. Such an operation is explained more fully below with reference to the FIGS. 4 and 5.

With reference now again to FIG. 1 any two of the pockets such as 14 and 16 are connected by a tubular connector such as connector 24. The connector 24 may be formed integrally with the pockets 14 and 16 by the heat sealing and cutting operation as also described below. Similar tubular connectors 20 and 22 connect the other pockets of the string of pockets 8. Also the tubular connector 26 is formed integrally with pocket 16 and extends forwardly therefrom as illustrated in FIG. 1. This end tubular connector 26 may be used as a filler connector.

Figure 3:
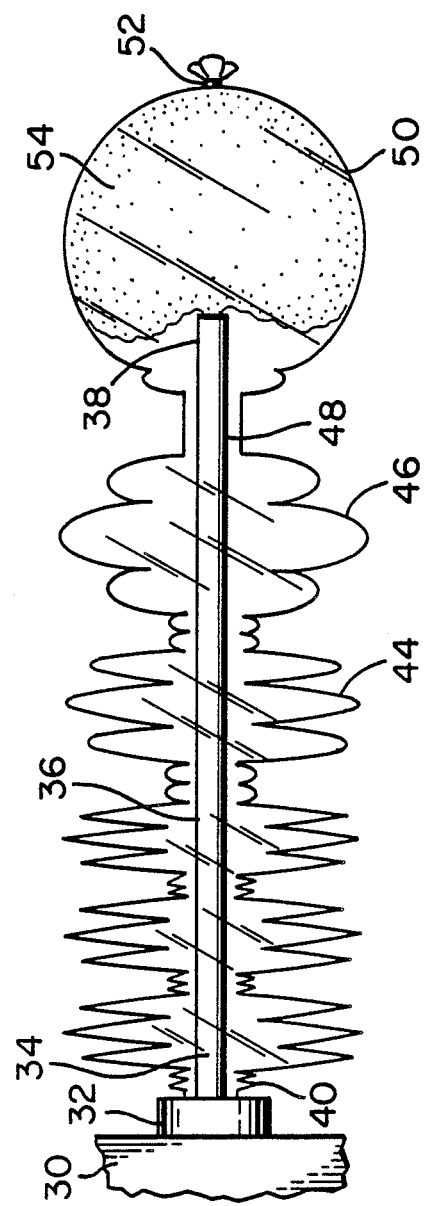
FIG. 3 is an semischematic illustration of a string of pockets as illustrated in FIG. 2 mounted on an filler pipe extending from an extruder.

The function and operation of a filler connector and the process for manufacturing the invention may be described with greater clarity by reference now to FIG. 3. FIG. 3 is a semischematic illustration of a string of pockets being filled with a congealabe slurry of savory spiced meat composition to form the product of the present invention. With reference now to FIG. 3 there is positioned on the left hand side of the figure an extruder mechanism 30 only a fragment of an external wall of which is shown in the figure. A flange 32 is mounted to the extruder and holds the entry end of a filler pipe 34. Congealable seasoned meat composition is churned and mixed in the extruder and is forced as a slurry out of the extruder through the filler pipe 36.

As is evident from FIG. 3 a string of connected empty pockets as described with reference to FIG. 1 is positioned on the filler pipe 36 by slipping the filler connector tube 40 over the end 38 of the pipe 36 and by threading each of the pockets and connector tubes of the string in turn onto the pipe. After the string of pockets has thus been mounted on the pipe 36 the extruder is activated to cause the spiced meat composition to be forced through pipe 36 to deliver the composition to the last pocket 50 of the string. Pocket 50 has two tubular connectors 48 and 52 but the connector tube 52 has been closed as by clamping or tying. Accordingly the pocket 50 fills with the seasoned meat composition 54 as the only exit for the composition is closed.

The extruder is continuously operated and the congealable seasoned meat slurry filler fills the pocket 50 as it is slowly withdrawn from the pipe end 38. The congealable seasoned meat slurry itself contains finely ground meat and meat juices and is essentially the same composition as is used in forming conventional hot dogs. The seasoned meat filler then fills the connector tube 48 and then the pocket 46. As the filling goes on the string of pockets is slowly moved to the right to bring an empty connector such as 48 and an empty pocket such as 46 into the proper position to receive the meat product from the end 38 of the filler pipe 36. In this way the entire string of pockets and connector tubes is filled. The pockets at the left side of FIG. 3 are shown in the collapsed or folded condition and the pocket 50 at the right is shown in the fully unfolded condition. As the pockets are moved to the right and removed in turn from the end 38 of the filler pipe 36 the pockets are each filled to a desired degree with the seasoned meat composition. In this way a string of filled pockets is formed.

Figure 2:
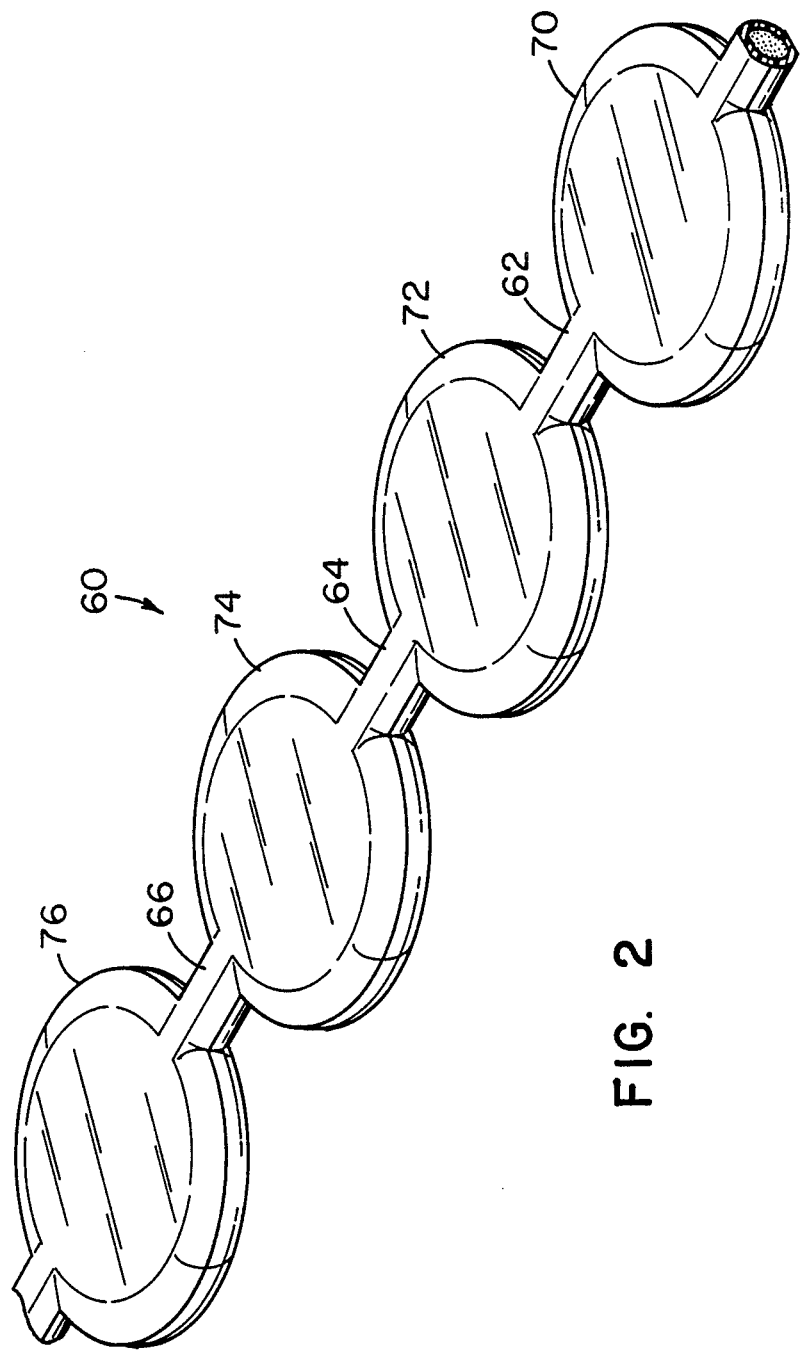
FIG. 2 is a semischematic illustration of a string of short cylindrical bodies which are linked by diametrically opposed tubular connectors.

Referring now next to FIG. 2 the string of filled pockets 60 are seen to be connected by the connector tubes 62, 64 and 66. Each pocket has a thickness and is no longer the flat two layer structure illustrated in FIG. 1. The individual pockets 70, 72, 74 and 76 are seen to have generally flat tops and flat bottoms with diametrically opposed short rod-like extensions emanating from opposite rounded sides of said pockets and interconnecting said pockets, said rod-like extensions being aligned linearly and being formed from the filling of connector tubes during the manufacturing process. This configuration is not the simple and inevitable result of filling the pockets. In fact when an individual pocket is filled it tends to open up like a balloon and to have rounded surfaces. Accordingly a secondary step is needed in according the pockets the uniform thickness that is seen in FIG. 2.

A first measure in achieving the short cylindrical configuration, with flat tops and bottoms, is to underfill the pockets. If the individual pockets are filled to their maximum volume they take on a rounded upper and lower surface which cannot be eliminated without emptying some of the seasoned meat composition from the pocket. So a first step in forming the meat products of this invention is to underfill the pockets in which the product is formed. The next measure is to apply some shaping element to the pockets to accord them the flat top and bottom which is illustrated in the FIG. 2. This could involve simply pressing the filled pockets gently between two flat surfaces. For example the string 60 can first be placed on a flat surface. Then while they are on the surface a second flat surfaced object can be placed on them to give the top surface a flat shape similar to the bottom surface.

Next in forming the products of the present invention the pockets and their contents are heated. The heating need not be intense to present any danger of burning them. Rather the heating is sufficient only to congeal the seasoned meat composition in place within the pockets and to give the content of the pockets the distinct and novel shape which conforms generally to the shape of the pocket in which the product is formed. The technology of filling a casing such as the pockets 70 through 76 with a seasoned meat composition and then heating the filled casing to congeal the composition and to give it the shape of the casing has been used in making ordinary frankfurters and similar products. However, to applicants knowledge they have never been used to make products as described herein. One desirable consequence of the heating is to form a skin on the surface of the congealed product. This skin gives the product, once removed from the casing, a smooth finished look and seals the flavor and juices into the product. The flat upper and lower surfaces of the product are thus entirely distinct in the skin that seals their surfaces from a product formed by forming a large cylinder and then slicing it to form a number of short cylinders.

After the products have been flattened and then heated to congeal the spiced meat composition the product is cooled and this cooling assists in sealing the flavor within the product and in preserving the unique product shape. Lastly the casing is peeled off the product to leave the individual short round cylindrical products As formed the products have a congealed protein skin which gives them a uniform appearance so that there is very little difference in appearance from one product to another.

A number of advantages are made possible by the product of the present invention. One such advantage is that the product can be cooked evenly on both sides to avoid the overcooking and undercooking which is more characteristic of the conventional hot dog. Another advantage is that because the spiced meat is held in a short cylindrical form rather than the long skinny cylinder of the conventional hot dog the product does not tend to dry out as readily. More of the product juices desired by the eater are retained in the short cylindrical form of the product. Moreover, just as the product of this invention tends less to dry out in cooking the product tends less to change its shape as by curling up as a result of cooking. The ratio of product diameter to thickness must be greater than two and may be three or four or more.

In addition there is, as noted above, a reduced tendency for children to bite off a piece which they will try to swallow whole and which can lead to a choking reaction. Further the accessories which are used with the product of this invention are more compatible with those already in use. For example the product can be employed with conventional hamburger buns and there is no need to have two different and distinct types of buns in order to get the advantages of the product. In addition the need for special cooking apparatus or devices is reduced or eliminated. Rather the product of this invention can be cooked on the same general purpose cooking apparatus as the more conventional hamburger. Where such apparatus is useful in cooking the conventional hot dog, as for example on a conventional grill, the problem of the dog rolling off the grill is eliminated. The further problem of uneven cooking on such grills is also greatly reduced.

Turning now to FIGS. 4 and 5 a apparatus for forming the products of the present invention on a continuous basis is presented and described. FIG. 4 is a top plan view of the apparatus and FIG. 5 is a side elevation of the same apparatus. In FIGS. 4 and 5 like numbers are used to indicate like parts of the apparatus. An extruder 100, only a fragment of which is shown, is used to supply a congealable spiced meat composition through a flange 102 to a delivery pipe or nozzle 104. The nozzle 104 extends out a distance from the extruder and delivers the composition at a location remote from the extruder 100. The apparatus is unique in that it makes possible the formation of a continuous string of pockets along the path of the nozzle so that when the contents of the nozzle are emptied they pass right into a freshly formed pocket.

To do this there is provided two film strips 106 and 108 from respective sources such as rolls not shown. The strips pass over two feed rollers 110 and 112 and then pass into the nip of two rollers 114 and 116. The pairs of rollers 110 and 112 and 114 and 116 are supported in place by conventional means which are not shown and which form no part of this invention. The strips are a heat sealable plastic so that the pockets may be formed by heat sealing the two layers of plastic together in the configuration of pockets and connector tubes. The upper roller 114 is a heated roller, which is heated by means not shown, and has mounted on its surface a shaped heater and cutter blade 117. The blade is shaped to operate like a connected cookie cutter on the plastic strips 106 and 108 as the strips pass between the rollers 114 and 116.

Roller 116 is a smooth surfaced roller which is covered with a layer of a material such as a polyfluorocarbon to resist the heat of the blade 117 and to resist any sticking of the sealed plastic strips 106 and 108. Such a material is available commercially under the trademark "TEFLON", a trademark of the du Pont Company Roll 116 has a central groove 115, shown in phantom, which permits the nozzle 104 to extend therethrough to deliver the spiced meat composition to the heat sealed pockets which are formed and sealed at the bite of the rollers 114 and 116. Extraneous parts 118 and 119 of the strips are separated from the string of pockets as they leave the rollers and are discarded. The plastic strips 106 and 108, from which the pockets are formed by heatsealing at the rolls, may be a coated cellulose type of strip which serves as a casing and which does not impart any impurities to the food product which they contain.

The central portion of the strips is formed by the rolls 114 and 116 into a string of pockets 120. The string of pockets 120 are actually formed right around the nozzle 104 and travel down the nozzle toward the nozzle end 122. At the nozzle 122 the pockets are filled with the spiced meat composition such as the composition 124 in pocket 126. Suitable support means, not shown, such as travelling belts are provided to transport the filled pockets. The pockets are preferably slightly underfilled and transported to a set of rollers. The rollers give a flat top and bottom configuration to the filled pockets such as pocket 134 seen passing between rollers 130 and 132. In the manner described the products of the present invention are formed continuously. Following such forming the products are heated to congeal the seasoned meat composition. They are then cooled and the casing is removed therefrom. Such action may be accomplished on a continuous basis at additional stations, not illustrated, of an apparatus such as that illustrated in FIGS. 4 and 5.

What is claimed and sought to be be protected by Letters Patent of the United States is as follows:

1. Seasoned meat products which comprise a plurality of interconnected short bodies of generally cylindrical configuration containing congealed meat slurry, said bodies having diametrically opposed short rod like extensions emanating from opposite rounded sides of said bodies and interconnecting said bodies, said rod like extensions being aligned linearly and being formed from the filling of tubular connectors during manufacture of said bodies, said bodies having generally symmetrical flat tops and bottoms, and said bodies having a diameter to thickness ratio of at least two.

2. The products of claim 1 in which the bodies have a skin formed on the body exterior to retain product juices therein.

3. The products of claim 1 in which the bodies are enclosed within a conforming plastic sheath in which the bodies were formed.

4. A spiced meat product which comprises a plurality of generally cylindrical bodies of congealed meat slurry, said bodies having a thickness which is small relative to its diameter, said product being congealed from a slurry which includes finely ground meat and spices, said product having a generally cylindrical flat top and flat bottom and a skin formed at its surface in the congealing process which skin helps retain the meat juices in said bodies, said bodies having diametrically opposed short rod-like extensions emanating from opposite rounded sides of said bodies and interconnecting said bodies, said rod-like extensions being aligned linearly and being formed from the filling of tubular connectors during manufacture of said bodies.

5. The invention of claim 4 wherein said congealed meat slurry is enclosed within a generally circular plastic pocket.

* * * * *